G. T. OIUM.
MACHINE FOR MAKING PHONOGRAPH NEEDLES.
APPLICATION FILED FEB. 24, 1919.

1,340,400.

Patented May 18, 1920.
2 SHEETS—SHEET 1.

Inventor
George T. Oium
By his Attorneys

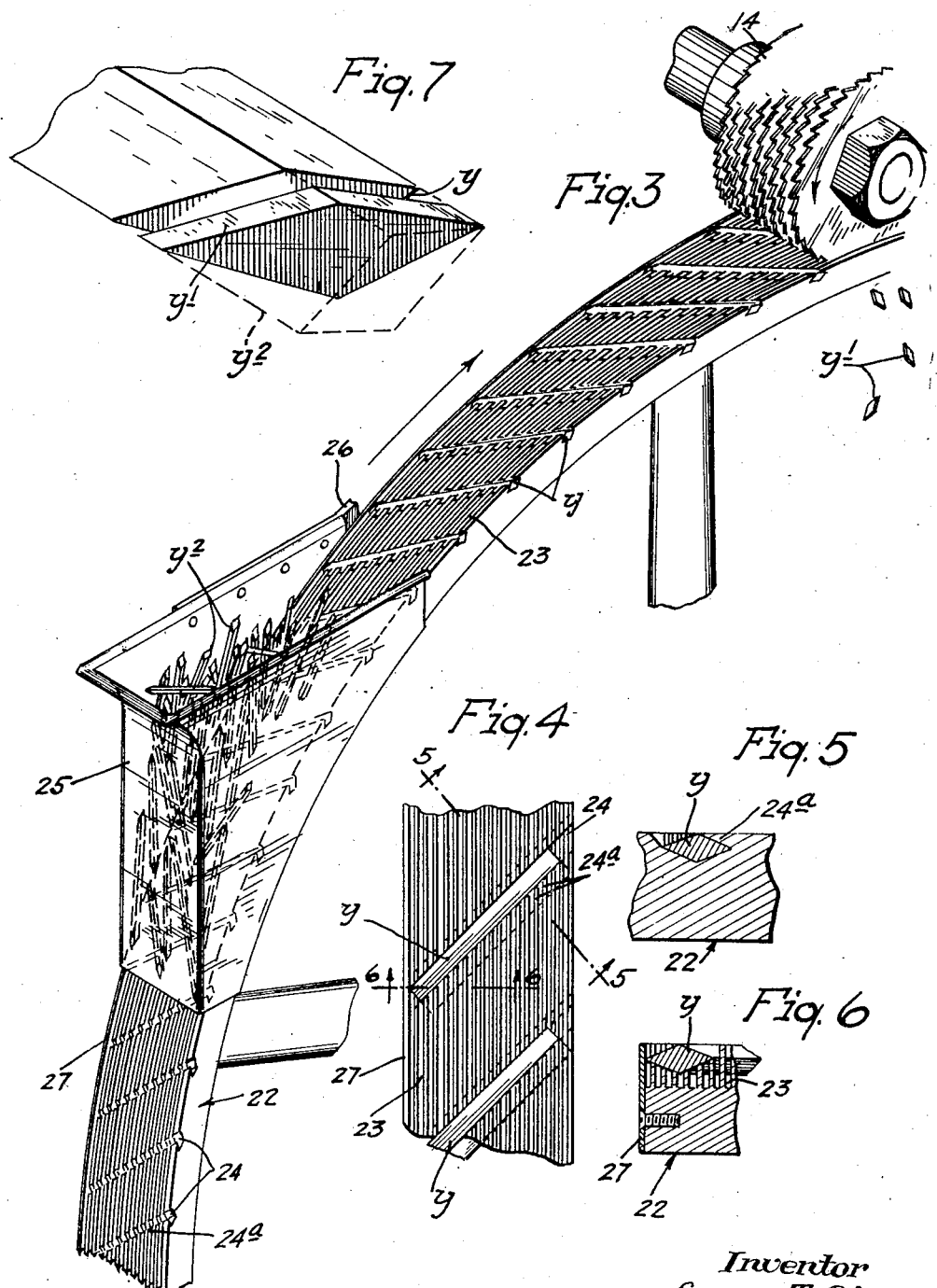

UNITED STATES PATENT OFFICE.

GEORGE T. OIUM, OF MINNEAPOLIS, MINNESOTA.

MACHINE FOR MAKING PHONOGRAPH-NEEDLES.

1,340,400. Specification of Letters Patent. Patented May 18, 1920.

Application filed February 24, 1919. Serial No. 278,641.

*To all whom it may concern:*

Be it known that I, GEORGE T. OIUM, citizen of the United States, residing at Minneapolis, in the county of Hennepin and State of Minnesota, have invented certain new and useful Improvements in Machines for Making Phonograph-Needles; and I do hereby declare the following to be a full, clear, and exact description of the invention, such as will enable others skilled in the art to which it appertains to make and use the same.

My invention has for its object to provide a simple and highly efficient machine for automatically sawing phonograph needles, and is particularly directed to a machine for making phonograph needles of the character disclosed and claimed in the application of Roscoe C. Johnston, S. N. 269,790, filed January 6th, 1919, and entitled "Phonograph needle and process of making the same."

In the process of making needles of the above character, blank pieces diamond-shaped in cross section, are first made from bone and then the needles are formed by cutting these blanks obliquely to the major axes.

My machine takes the diamond-shaped blanks or bars that are diamond-shaped in cross section, and saws the same obliquely to form the needles.

The improved machine is illustrated in the accompanying drawings, wherein like characters indicate like parts throughout the several views. Referring to the drawings:—

Fig. 3 is a fragmentary perspective showing the saws and the blank bar carrying wheel, some parts being broken away;

Fig. 4 is a plan view of a portion of the carrying wheel;

Fig. 5 is a section on the line 5—5 of Fig. 4;

Fig. 6 is a section on the line 6—6 of Fig. 4; and

Fig. 7 is a perspective view illustrating the manner in which the needles are cut from the blank bar.

Figure 1:
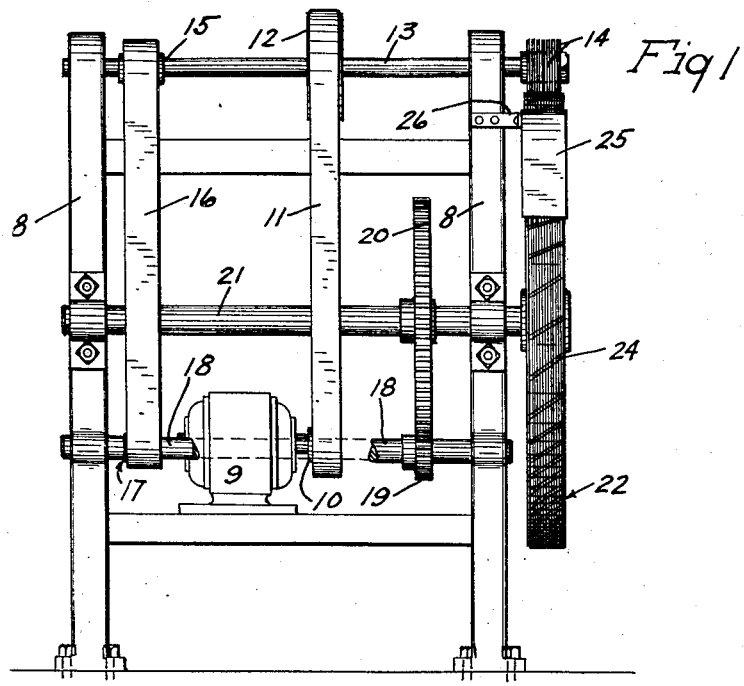
Figure 1 is a front elevation of the improved machine.
Figure 2:
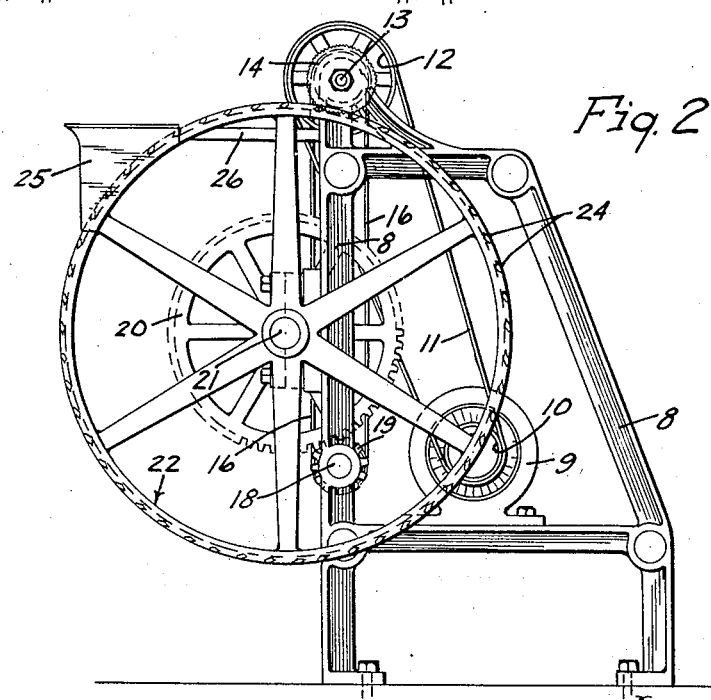
Fig. 2 is a side elevation thereof.

The machine has a suitable frame work 8 on which is mounted a motor, preferably an electric motor 9, the armature shaft of which carries a driving pulley indicated by the numeral 10. A belt 11 runs over the pulley 10 and over pulley 12 on a saw shaft or spindle 13. This shaft 13 is journaled in suitable bearings on the top of the frame 8, and at one end carries a multiplicity of small parallel laterally spaced thin saws 14.

The saw shaft 13 carries a pulley 15 and a belt 16 runs over this pulley 15 and over a pulley 17 on a counter-shaft 18 which latter is mounted in suitable bearings on the frame 8. The shaft 18 carries a spur pinion 19 that meshes with a large spur gear 20 on a drum shaft 21 that is also mounted in suitable bearings on a frame 8. In line with the saws 14, the shaft 21 is provided at one end with a large drum or carrying wheel 22. The periphery of this drum is formed with circumferentially laterally spaced channels 23 in each of which, the teeth of one of the saws 14 is arranged to work. These channels 23 are intersected at oblique angles by blank-bar holding-channels 24 that are circumferentially spaced on the periphery of the carrying wheel and are formed to receive and hold the blank bars Y from which the needles $Y^1$ are formed. By reference particularly to Fig. 5, it will be noted that the channels 24 snugly fit the bars Y on three of their four sides and are open on the fourth side so as to permit insertion of the bars Y and the discharge of the needles. By reference to Fig. 6, it will be noted that the saw channels 23 are deeper than the holding channels 24 so that the saws may completely sever the needles from the blank bars. The direction of rotation of the saws and the carrying wheel, are indicated by arrows in Fig. 3, and it will be noted that the saws run in a direction to force the bars Y down into the channels 24 during the sawing action. It will be further noted that the over-lying lip portions $24^a$ of the holding channels 24 are formed as extensions of sections of the ribs formed between channels 23, and that these lips are pointed upward on the downward sides of the upwardly moving bars Y as they are carried and presented to the saws. This insures proper seating of the blank bars Y while they are being sawed into needles.

The blank bars Y may be inserted into the channels 24 by hand or automatically. In the drawings I have shown a hopper 25 one side of which opens against the carrying wheel for the delivery of the blank bars Y automatically into the channels 24, under upward movement of the carrying wheel. This hopper 25 is shown as supported by an arm 26, rigidly attached to the upper portion of the frame 8.

Preferably, the holding channels 24 at one side of the carrying wheel, to wit:—at that side in which the ends of said oblique channels 24 are most advanced in respect to the direction of the rotation of the wheel, are left open at their ends but are closed at their opposite ends by an annular stop-flange applied to or formed as a part of that side of the wheel.

The operation of the sawing machine is probably obvious from the foregoing statements, but may be briefly summarized as follows:—The blank bars Y, whether of bone or other material, being placed in the holding channels 24 either automatically or by hand, will be presented to the saws and the saws will cut each bar Y into a multiplicity of small diamond-shaped needles $Y^1$. The obliquity of the holding channels 24 gives the proper bevel and form to the edges of the needles and moreover, causes the saws to act progressively on each blank bar, and to begin action on one blank bar at or about the time that they complete the sawing action on the blank bar previously presented thereto. When the blank bars Y are formed primarily with rectangular ends, there will be small angular waste pieces $Y^2$, indicated by dotted lines in Fig. 7, but these pieces with the needles, will be discharged from the carrying wheel as they are sawed or other further rotation of the wheel.

Obviously, a machine of this character will saw a very large number of needles in a very short space of time, or otherwise stated, the capacity of this machine for producing needles, is very high both in point of time and the low cost of production.

What I claim is:

1. In a machine for making phonograph needles from blank bars, the combination with a plurality of laterally spaced saws and means for supporting and rotating the same, of a carrying wheel having peripheral grooves in which the said saws work and also having bar holding channels that intersect the said peripheral grooves, said channels being oblique to said grooves and adapted to hold the blank bars while they are being presented to the saws.

2. In a machine for making phonograph needles from blank bars, the combination with a plurality of laterally spaced saws and means for supporting and rotating the same, of a carrying wheel having peripheral grooves in which the said saws work and also having bar holding channels that intersect the said peripheral grooves, said channels being oblique to said grooves and adapted to hold the blank bars while they are being presented to the saws, the said peripheral grooves being deeper than the said holding channels.

3. In a machine for making phonograph needles from blank bars, the combination with a plurality of laterally spaced saws and means for supporting and rotating the same, of a carrying wheel having peripheral grooves in which the said saws work and also having bar holding channels that intersect the said peripheral grooves, said channels being adapted to hold the blank bars while they are being presented to the saws, the said holding channels being oblique to said grooves and being closed at those ends that are backward in respect to the direction of the rotation of said carrying wheel.

4. In a machine for making phonograph needles from blank bars, the combination with a plurality of laterally spaced saws and means for supporting and rotating the same, of a carrying wheel having peripheral grooves in which the said saws work and also having bar holding channels that intersect the said peripheral grooves, said channels being adapted to hold the blank bars while they are being presented to the saws, and the said peripheral grooves being deeper than the said holding channels.

5. In a machine for making phonograph needles from blank bars, the combination with a plurality of laterally spaced saws and means for supporting and rotating the same, of a carrying wheel having peripheral grooves in which the said saws work and also having bar holding channels that intersect the said peripheral grooves, said channels being adapted to hold the blank bars while they are being presented to the saws, and means for rotating the said saws and carrying wheel, the former at a relatively very high speed in respect to the latter.

6. In a machine for making phonograph needles from blank bars, the combination with a plurality of laterally spaced saws and means for supporting and rotating the same, of a carrying wheel having peripheral grooves in which the said saws work and also having bar holding channels that intersect the said peripheral grooves, said channels being adapted to hold the blank bars while they are being presented to the saws, the said holding channels being constructed to fit three sides of a blank bar that is diamond shape in cross section and being open at the fourth side for the admission of the blank bars to said channels.

7. In a machine for making phonograph needles from blank bars, the combination with a plurality of laterally spaced saws and means for supporting and rotating the same, of a carrying wheel having peripheral grooves in which the said saws work and also having bar holding channels that intersect the said peripheral grooves, said channels being adapted to hold the blank bars while they are being presented to the saws, the said holding channels being constructed to fit three sides of a blank bar that is diamond shape in cross section and being open at the fourth side for the admission of the blank bars to said channels, the said open sides of said channels being forward in respect to the direction of rotation of said carrying wheel.

In testimony whereof I affix my signature in presence of two witnesses.

GEORGE T. OIUM.

Witnesses:
CLARA DEMAREST,
JAS. F. WILLIAMSON.